United States Patent [19]

Ohara et al.

[11] 4,327,436
[45] Apr. 27, 1982

[54] SIGNAL MONITORING AND CONTROLLING SYSTEM IN A TIME DIVISION SWITCHING SYSTEM

[75] Inventors: Susumu Ohara, Yokosuka; Akira Horiki, Yokohama; Katsuyuki Miyazaki, Yokohama; Kaoru Tokunaga, Yokohama, all of Japan

[73] Assignee: Hitachi, Ltd., Tokyo, Japan

[21] Appl. No.: 967,846

[22] Filed: Dec. 8, 1978

[30] Foreign Application Priority Data

Dec. 9, 1977 [JP] Japan .................................. 52/147044
Dec. 9, 1977 [JP] Japan .................................. 52/147045
Dec. 9, 1977 [JP] Japan .................................. 52/147046

[51] Int. Cl.³ .......................................... H04J 3/12
[52] U.S. Cl. .................................. 370/110.1; 370/56; 370/58
[58] Field of Search ........ 179/18 FC, 15 BY, 15 AT; 370/56, 110, 58, 66

[56] References Cited

U.S. PATENT DOCUMENTS

| 3,778,555 | 12/1973 | Nordling | 179/18 FC |
| 3,997,727 | 12/1976 | Platts | 370/110 |
| 4,001,514 | 1/1977 | Wurst | 179/18 FC |
| 4,016,367 | 4/1977 | Law | 179/15 BY |
| 4,110,562 | 8/1978 | Mogd | 370/110 |

Primary Examiner—David L. Stewart
Attorney, Agent, or Firm—Craig and Antonelli

[57] ABSTRACT

A supervisory and control system for a time division switching system supervising and controlling signals transferring to and from all or some of line interface equipment such as a digital trunk, analog trunk equipment, the intra-office line concentrators or remote line concentrator through a signal path. In the signal control, the signal is classified into two kinds of signals: one for cyclically controlling a state and the other for randomly controlling the same. Those signals are multiplexed in a single time slot to control the various line interfaces. Signal time slots having different multiframes and signal time slots with a plurality of periods are supervised depending on a signal path class thereby to reduce the number of laying cables among interframes.

3 Claims, 9 Drawing Figures

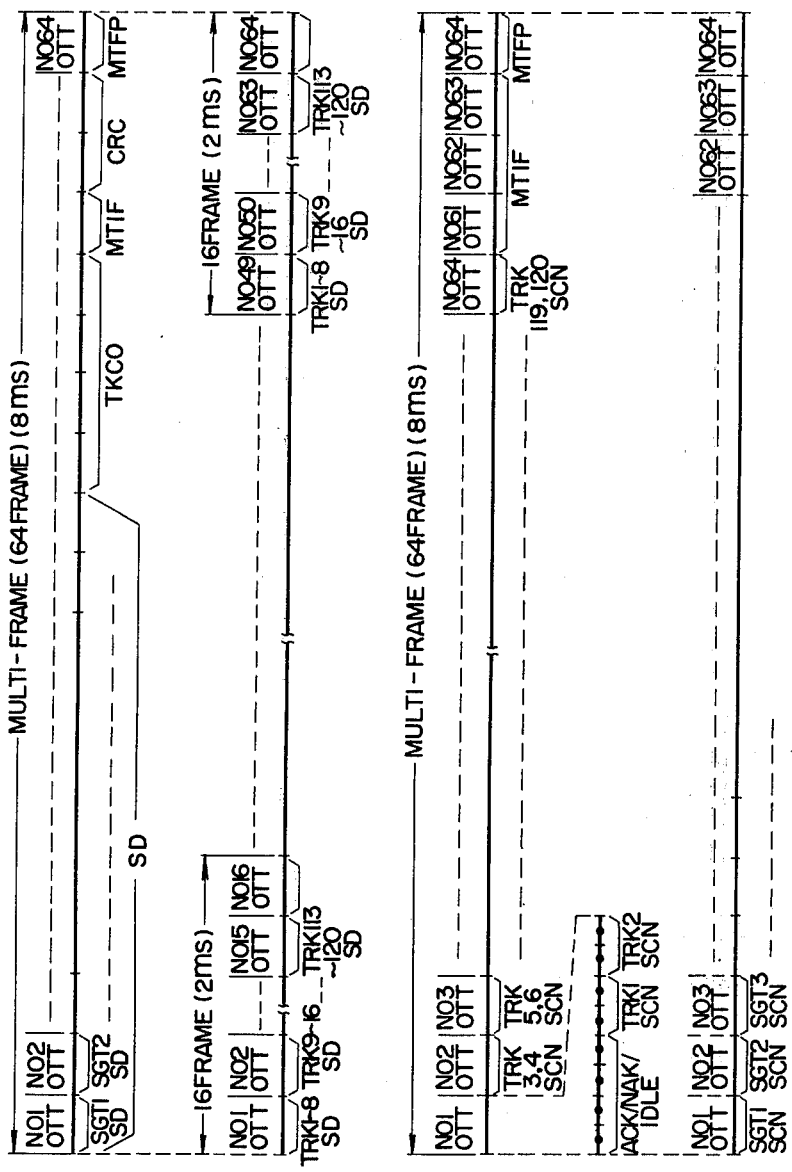

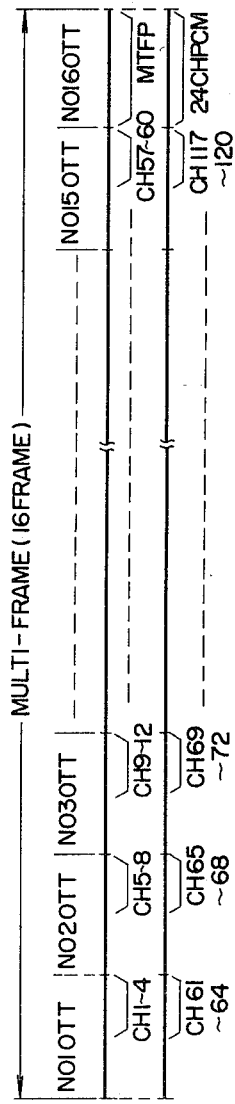
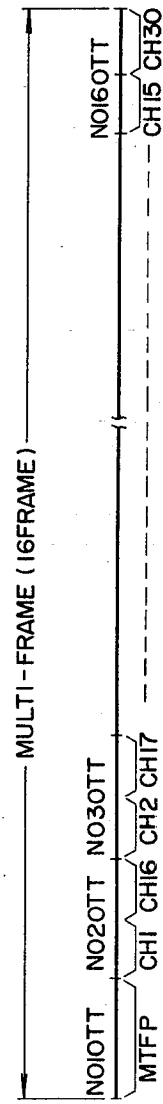
FIG. 6A
FIG. 6B

FIG. 8

| CLS | ADCNT | MFCNT | GCNT | SYNST | LL | D/S | RMSTP | AD | ND | LADR | CRCM | CRCG/N |

FIG. 9

| CLS | ADCNTSTP | SMACNT | MFCNT |

SIGNAL MONITORING AND CONTROLLING SYSTEM IN A TIME DIVISION SWITCHING SYSTEM

The invention relates to a time-division switching system and, more particularly, a signal monitoring and controlling system including a signal controller which acts as an interface for executing signal concentration and distribution between a central processor unit and line interfaces such as subscriber's line concentrators or trunk equipment in a time-division switching system.

With respect to the signal monitoring and controlling operation, there has been a case where the signal monitoring and controlling operation of a remote subscriber's line concentrator is performed through a digital multiplex transmission line. In the intra-office signal monitoring and controlling operation, it is common practice that a space signal path is established ranging from a signal controller to a monitoring and a controlling point, for the purpose of effecting direct monitoring and controlling operation. In the time-division switching system for switching digitized voices, digital coded voice information is multiplexed on a time-division highway so that the necessary number of inter-frame cables is remarkably reduced which connect frames having the individual line interface equipment, such as a subscriber's line concentrator, a trunk, and a time-division speech path, which are installed in those frames to cooperatively constitute a speech path, as compared with the space switching system. In order to fully make use of the advantages of the time division switching, it is desirable that a monitor signal path for transmitting to a central processor unit monitor information as to a state of a signal monitoring point for signals such as call and disconnection and a control signal path which is a signal path for transmitting control signal information to instruct a trunk equipment to transmit a seizer signal and the like to other stations are multiplexed on the time-division highway in a similar manner to the coded voices. This also results in reduction of the number of cables. Particularly in a case where a subscriber's line concentrator constituting a part of a speech path system is installed in a remote place, it may safely be said that the just-mentioned method is essential.

Further, when such a signal path is multiplexed by using signal path time slots on the time-division highway, one of the effective ways to concentrate connect signal path time slots to a signal controller which acts as a central processor interface for the signal monitoring and controlling operation is to use the switching operation of the time-division switch because such a way flexibly permits replacement and increase of the subscriber's line concentrators or trunk equipment.

Accordingly, an object of the invention is to provide a signal monitoring and controlling system for a time division switching system which can reduce the number of necessary cables for making connection among an analog trunk equipment, a digital trunk and subscriber's line concentrators in the signal monitoring and controlling operation.

To achieve the object, the monitor and control information from/to line interface equipment such as analog trunk equipment, digital trunk equipment and subscriber's line concentrators are multiplexed in the time division highway. Signal time slots provided on the time division highway for transmitting the supervisory monitor and control information of the line interface equipment are connected to a signal controller by a predetermined switching in a time division switch. In receiving mode, the signal controller determines the line interface equipment from which each signal time slot comes through the time division highway, and demultiplexes an information arrangement in the signal time slot. The demultiplexed information is processed by a central processor unit. In the transmitting mode, transmitting signal information including control information from the central processor unit is multiplexed in a given time position of the respective signal time slots. With such an arrangement, the respective line interface equipment may be collectively monitored and controlled through a speech path.

A second object of the invention is to provide a signal monitoring and controlling system for a time division switching system in which the monitor information from analog trunk and digital trunk equipment and a subscriber's line concentrator may be effectively received by a signal controller connected to a central processor unit with a reduced number of cables.

To achieve the object of the invention the monitor and control information, from/to line interface equipment such as analog trunk equipment and digital trunk equipment and subscriber's line concentrators are multiplexed in the time division highway. Signal time slots provided on the time division highway for transmitting the monitor and control information of the line interface equipment are connected to a signal controller by a predetermined switching in a time division switch. In the signal monitoring and controlling operation, the signal reception by the signal controller is carried out under control of a control word read out from a control memory provided previously, in synchronism with each signal time slot. The control word includes multiframe control information to discriminate multiframes in the respective signal time slots, an address counter for making an access to a temporary storage memory for storing receiving information in such a way, and an address information save area for saving the contents of the address counter and returning the saved contents to the address counter. The information transferred with different time regions by using a multiframe constituted by the signal time slot is demultiplexed. The demultiplexed information is stored in the divided areas in the temporary memory. The demultiplexed information stored in the temporary memory is later read out by the central processor unit and is used for preparing control information transmitted from the signal controller.

A third object of the invention is to provide a monitoring and controlling system for a time division switching system in which control information to analog trunk and digital trunk equipment and a subscriber's line concentrator may be effectively transmitted from a signal controller connected to a central processor unit, with a reduced number of cables.

To achieve the third object, in the present invention, the control signal transmitted from an information controller to a subscriber's line concentrator is classified into a cyclic signal needing a renewal by transmitting a correct state with a predetermined interval and a random signal requiring a random change of state. Both the signals are transmitted through a single time slot with divided transmitting time regions for a cyclic and a random signal.

Other objects and features of the invention will be apparent from the following description taken in connection with the accompanying drawings, in which:

FIGS. 5A to 5D show a signal path construction for analog trunk equipment;

FIGS. 6A and 6B show signal path constructions for a digital trunk accommodating 24-channel and 32-channel digital transmission lines;

FIG. 8 shows a format of a control word stored in a receiving time slot memory in the signal controller; and FIG. 9 shows a format of a control word stored in a transmitting time slot memory in the signal controller.

The present invention will be described in detail with reference to FIGS. 1 to 9.

Figure 1:
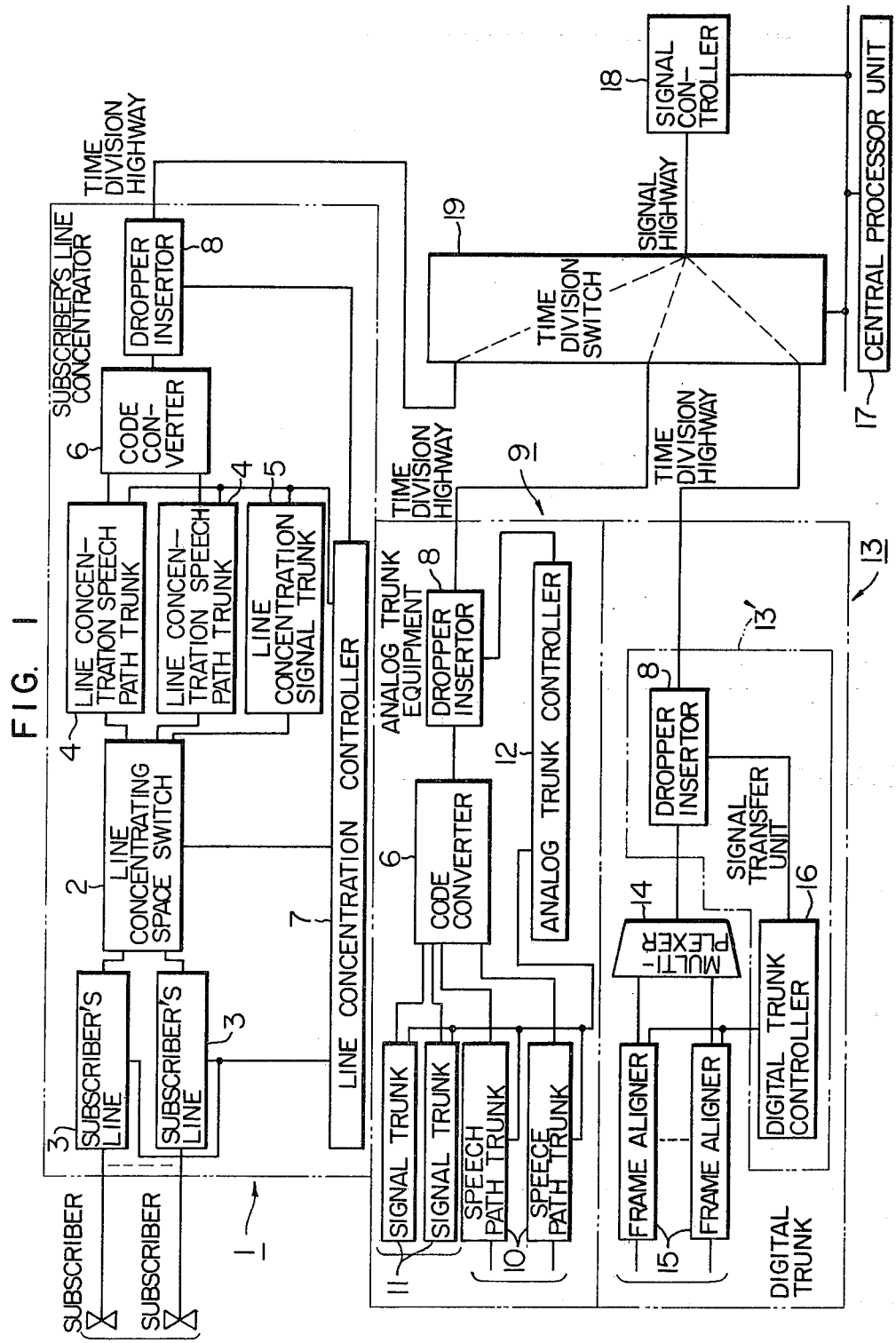
FIG. 1 shows a block diagram of a signal monitoring and controlling system according to the invention.

FIG. 1 shows a block diagram of a signal monitoring and controlling system according to the invention. The function of the system components, as well as concentration and distribution of signals will be outlined in brief with reference to FIG. 1. A subscriber's line concentrator designated by reference numeral 1 employs a line concentrating space switch 2 in this example, line concentration speech path trunks 4, line concentration signal trunks 5, and subscriber's line circuit 3 each of which is provided with a signal monitoring point to be scanned to obtain monitor information and a signal controlling point to be supplied with control information in accordance with the monitor information. The subscriber's line circuits 3 include signal monitoring points for monitoring an off-hook call from a calling party, for example. The trunks 4 and 5 installed at the succeeding stage of the line concentrating space switch 2 each have the signal monitoring point to be scanned to obtain monitor information such as calls after line-concentrated and a signal controlling point to be supplied with control information. For example, the line concentration speech path trunk 4 connected to an analog-digital converter 6 (hereinafter referred to as CODEC) includes a signal monitoring point to be scanned to obtain monitor information such as dial pulses. The line concentration signal trunk 5 is provided with a signal controlling point for ringing transmission. These signal monitoring points are scanned by a line concentration controller 7 to detect the states thereof. The scanning intervals are determined depending on the signal to be monitored. For example, the subscriber's line circuit 3 may be scanned at relatively longer intervals, for example, about 64 ms as compared to the line concentration speech path trunk 4 for monitoring dial pulses. The states of the respective signal monitoring points scanned by the line concentration controller 7 are multiplexed onto a signal path having specified time slots on a time division highway through a dropper inserter 8. Conversely, the control information, for example an order to transmit ringing, is demultiplexed through the dropper inserter 8 from the signal path constructed by a specified time slot on the time-division highway and is applied to the corresponding signal controlling point under control of the line concentration controller 7. For example, in a control mode of ringing transmission, a necessary control signal is applied to the signal controlling point of the ringing trunk.

Figure 2A:
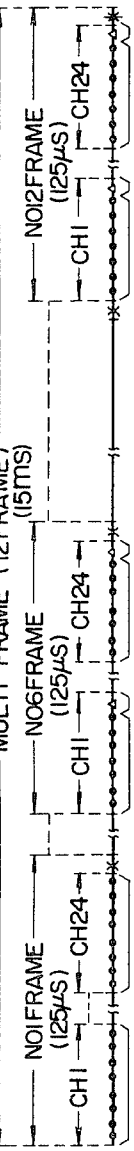
FIGS. 2A and 2B show signal path constructions on digital transmitting paths of a 24-channel and a 32-channel digital transmission line, respectively.
Figure 2B:
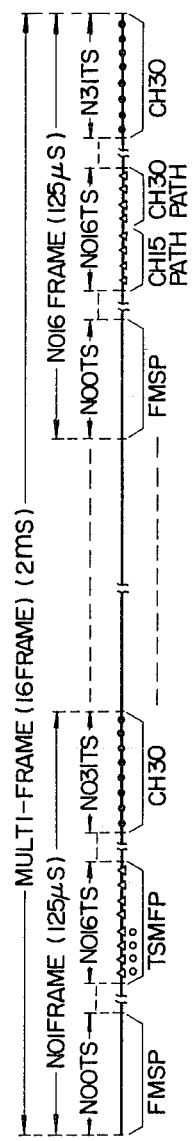

Reference numeral 9 designates analog trunk equipment accommodating analog trunks such as a speech path trunk 10, for example an incoming trunk or an outgoing trunk, and a signal trunk 11, for example, MF (multifrequency) receiver and sender. An analog trunk controller 12 scans the signal monitoring points of the speech path trunks 10 and the signal trunks 11 and multiplexes the state of the signal monitoring point on the time division highway through the dropper inserter 8, while distributing control information for a trunk coming through the dropper inserter 8 to the signal controlling points of the corresponding trunk. Reference numeral 13 designates digital trunk equipment accommodating digital transmission lines. In the digital trunk 13, synchronizing equipment 15 for aligning bits and frames (hereinafter referred to as frame aligner) are connected to a multiplexer 14. In the case of the digital transmission line executing a PCM frame synchronizing control with termination of the digital transmission line, the signal path is time-division multiplexed on the digital transmission line. The state of the signal path is different between a 24-channel system and a 32-channel system, even in the primary PCM group. FIGS. 2A and 2B show the formats of the signal paths of the 24-channel system (24CH) and the 32-channel system (32CH), respectively. As shown in FIG. 2A, on the 24CH digital transmission line with a multi-frame (MTFM) including 12 frames, each time slot in the 6th and 12th frames is comprised of 7 bits indicated by . (dot) symbols for voice and 1 bit indicated by Δ (triangle) symbols for signals each to identify the corresponding channel. The digital trunk controller 16 shown in FIG. 1 multiplexes the state represented by the signal bit on a receiving digital transmission line onto the signal time slots on the time-division highway and at the same time it transfers the control signal corresponding to each channel received through the dropper inserter to the signal bit position on a digital transmission line. In the 32CH digital transmission path shown in FIG. 2B, the 16th time slot of each frame is used for the signal path, 8 bits in each signal path time slot are divided into two blocks, each including four bits, corresponding to two channels. Accordingly, in the 16 signal octets (OTT) constructed by 16 frames, the first signal octet is used for the multiframe synchronizing. In that case, the remaining 15 signal octets form the signal paths corresponding to $2 \times 15 = 30$ channels.

As just mentioned, in the case of the 32CH digital transmission path, the time slot (the 16th time slot) independently provided is assigned to the signal path of the transmission line, as in the case of the coded voice signal, so that it may be connected directly to the time-division highway without the digital trunk controller 16 and the dropper inserter 8 shown in FIG. 1. In FIG. 2A, x symbols and * symbols represent a frame synchronizing and a multiframe synchronizing pattern respectively. In FIG. 2B, FMSP and TSMFP designate a frame synchronizing pattern or an international trouble indication, and a signal time slot multiframe pattern, respectively.

As described above, monitor information such as scanning signals occurring in the subscriber's line concentrator 1, the analog trunk equipment 9 and the digital trunk equipment, and control information given to control the trunk equipments and the like are multiplexed onto the signal paths on the time-division highway. The signal time slots on the time-division highway are multiplexed onto a signal highway accommodating a signal controller 18 serving as an interface between a time-division switch and a central processor unit 17 in the signal monitoring and controlling system.

The explanation will follow with respect to the kinds of the monitor and control information respectively transmitted and received through the signal time slots on the time division highway, and the transmitting formats thereof, and an allocation of the signal time slots on the time division highway, in order to monitor the subscriber's line concentrator 1, the analog trunk 9, and the digital trunk 13.

Figure 3A:
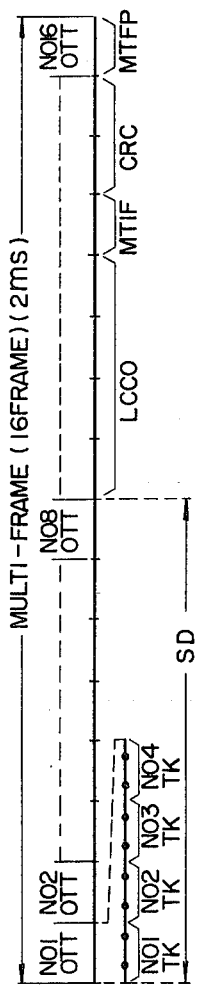
FIGS. 3A and 3B and FIG. 4 show signal paths for a subscriber's line concentrator.
Figure 3B:
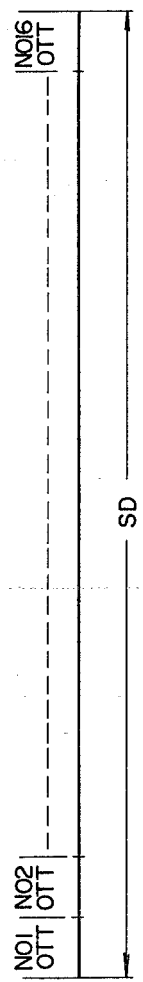
Figure 4:
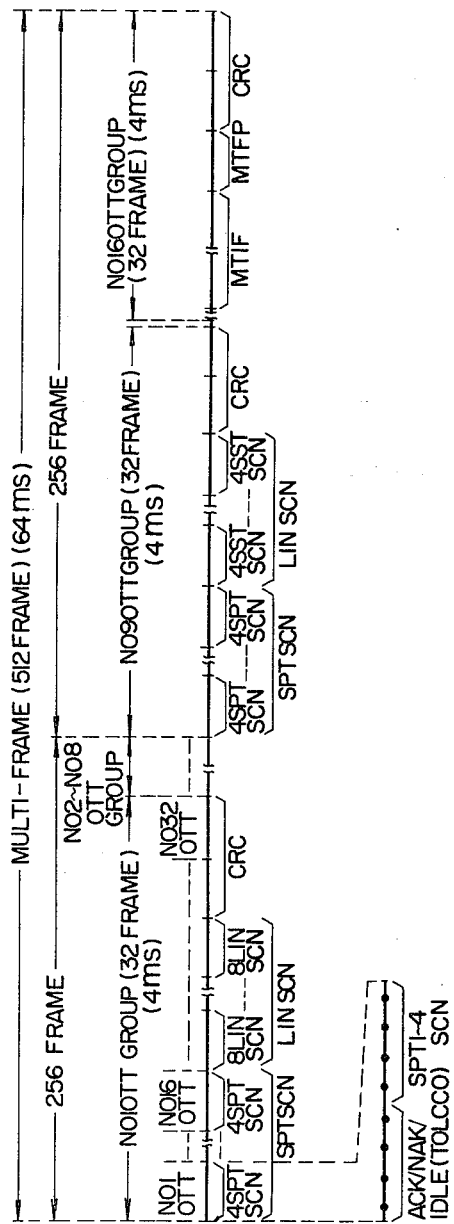

FIGS. 3 and 4 show examples of allocations of signal paths for monitor and control information from/to the subscriber's line concentrator 1. Specifically, FIGS. 3A and 3B illustrate signal path arrangements of the control information from the signal controller 18 to the line concentration controller 7. FIG. 4 shows a signal path arrangement of the monitor information transferred from the line controller 7 to the signal controller 18. Reference is first made to FIGS. 3A and 3B. The control information shown in FIGS. 3A and 3B has two time slots assigned thereto on the time division highway. These two time slots are called first and second signal time slots. Each time slot forms a multiframe by 16 frames. The number of frames used depends on the scale of the subscriber's line concentrator and therefore it is not limited to that number. The control information for the subscriber's concentrator 1 is classified into two kinds of the information; one is the information which requires instantaneousness and strictness in the control as in the case of the control of the trunk to transmit a coin collecting signal to a public telephone, the other is the information which does not always require the instantaneousness as in the case of transmitting an order to transmit ringing to the trunk of the subscriber's line concentrator 1. The former information is usually called SD information which always delivers periodically the state information to the corresponding controlling point. The latter information is called an LC control order to control the line concentrator 1 by specifying the correct state of the object to be controlled by the control order and the object to be controlled keeps the specified state until it is placed under control by the succeeding control order.

The signal path constructed by the first time slot shown in FIG. 3A is provided with an SD information area for the trunk which requires the SD information and an LC control order area (LCCO) for the ringing transmission and the switching control of the line concentrator switch. Also in this case, in order to rapidly effect a control of maintenace such as switching of the subscriber's line concentrator 1, provided is an additional area for providing usually periodically maintenance information (MTIF) as in the case of the SD information. One time transmission of the LC control order area (LCCO) determines a state of the object to be controlled and holds its state. Since the erroneous operation due to incorrect maintenance information is dangerous, a cyclic redundancy check code (CRC) included in two octets is attached to the LC control order and the maintenance information (MTIF) for purpose of avoidance of erroneous operation.

The second time slots shown in FIG. 3B are fully occupied by the SD information area. This is provided for accepting an expansion of the scale of the subscriber's line concentrator 1. In a case where a small-scale line concentrator is installed in a remote place and is connected to a time division switching system through a digital transmission line, the signal monitoring and controlling operation may be executed only by the first signal time slot. The first time slot is provided with an octet for multi-frame pattern (MTFP). The multiframe synchronization of the second signal time slot may be performed by using the multiframe pattern of the first signal time slot. That is to say, the multiframe pattern of the first signal time slot is applicable to the multiframe synchronizations of both the first and second time slots.

The monitor information arrangement in the signal monitoring system will be described.

The first time slot shown in FIG. 4 includes the monitor information (SPTSCN) of the line concentrator trunk 4, the monitor information (LINSCN) of the subscriber's line and the monitor information of the line concentration trunk 5. This is the main information included. In this case, the subscriber's line and the line concentration trunk 5 may be scanned at long intervals, as compared with the scanning of the line concentration speech path trunk 4 including the signal monitoring points of the dial pulses 10 pps and 20 pps from a subscriber. In consideration of this, the multiframe (512 frames) of the first signal time slot is divided into 16 octet groups each comprised of 32 frames. Each octet group is provided with a scanning area of 16 octets for the line concentration speech path trunk 4. This enables the line concentration speech path trunk 4 of $64(=4\times16)$ to be scanned at 4 ms intervals. In the respective octet groups, the octet groups other than the first to eighth groups are used for a CRC code for the subscriber's line monitor information (LIN SCN) and the information of the respective octet groups. This enables the subscriber's lines of $896(=8\times14\times8)$ at maximum to be scanned at 64 ms interval. In the 9th to 15th octet groups, the subscriber's line monitor information may be replaced by the line monitor information (SST SCN) of the line concentration signal trunk 5. The maintenance information area may be provided in the latter half of 16 octets except the monitor information area of the line concentration speech path trunk 4 of the 16th groups. Any trouble information which occurred and is detected within the subscriber's line concentrator 1 is indicated in this area. When there is a duplicated part which synchronously operates within the subscriber's line concentrator 1, the states are verified at some verifying points in the duplicated part so that the results of the verification, coincidence or non-coincidence, may be indicated. The maintenance information enables both the trouble occurrence in the subscriber's line concentrator 1 and the contents of the trouble to be monitored by the signal controller 18. In this monitoring operation, if the verifying results of the duplicated part which is often indicated in the maintenance information are collected, it is possible to detect an abnormal operation in the subscriber's line concentrator 1 and the collected information may be used to separate the trouble part from the correct one.

In the first four bits of the 1st octet in each octet group, an area is provided to indicate "execution complete" or "execution not complete" of the LC control order transmitted to the subscriber's line concentrator 1 in terms of specific patterns ACK and NAK. When ACK is returned, the succeeding control order is transmitted. When NAK is returned, the retransmission of the LC control order is executed.

The information allotment of the first signal time slot of the monitoring operation system has been explained and illustrated in FIG. 4. The information arrangement (not shown) of the second signal time slot is the same as that of the first signal time slot, except that IDLE is always indicated in the indication area of ACK/NAK and that the maintenance information area is void.

FIG. 5 shows an arrangement of the monitor and control information on the time-division highway for the analog trunk equipment 9. As in the subscriber's line concentrator 1, two signal time slots are used for the signal monitoring and controlling operation.

FIGS. 5A and 5B show control information arrangements for the control information applied to the analog trunk controller 12. In 64 octets constituting the first signal time slots shown in FIG. 5A are included an area for SD information and an area for trunk control order, as in the case of the subscriber's line concentrator 1. The SD information is used for controlling the signal trunk 11 for MF signal and the like included in the corresponding analog trunk controller, and can provide an 8 bits pattern at 8 ms intervals for each signal trunk 11. A trunk control order (TKCO) is used to specify the trunk to be controlled and to designate its state to be maintained. A CRC code is attached to the octet forming the trunk control order and the maintenance information (MTIF). A control information arrangement of the second signal time slot shown in FIG. 5B is so designed as to transmit the SD information for 120 speech path trunks 10 at 2 ms intervals. The provision of such a short interval of 2 ms for the SD information transmission to the speech path trunk 10 is made to minimize a signal distortion in the time division speech path. In the time division speech path, the signal controlling points of dial pulses exist in the respective trunks 10. For this, the signal distortion takes place when the dial pulses are asynchronously transmitted from the central processor unit to the trunks 10 through a memory. It is notable that, if a given quality is secured, the interval is not limited to 2 ms. The multiframe synchronization in the first and second signal time slots is carried out by using the multiframe pattern provided in the 64th octet of the first signal time slots. In this case, the 16th and 64th octets in the second signal time slots are "empty".

The monitor information arrangement of the signal monitoring system will be given referring first to FIGS. 5C and 5D. Allocated to the first signal time slots in FIG. 5C are the trunk scanning monitor information (TRK SCN) of 120 trunk speech path trunks 10, the maintenance information (MTIF) including the contents of a trouble occurring within the analog trunk equipment 9 and the results of verifying a state of a portion operating in duplicate synchronizing fashion, and the indication area of ACK/NAK information representing "execution complete" and "execution not complete" within the analog trunk equipment 9 of the trunk control order, shown in FIG. 5A. The second signal time slot shown in FIG. 5D includes the monitor information (SGT SCN) for the signal trunk 11 for an MF signal and the like, and permits an 8 bits pattern to be scanned and transmitted at the interval of 8 ms per one signal trunk.

FIGS. 6A and 6B show monitor and control information arrangement on the time division highway for the digital trunk 13. The signal time slot arrangement shown in FIG. 6A is the five systems of 24 channel digital transmission line in which two signal time slots are provided for the signal monitoring and controlling operation of 24×5=120 channels. Transfer of signals onto the signal time slots on the digital transmission line and the signal time slots shown in FIG. 5A is asynchronously carried out by using a signal transfer unit designated by 13' shown in FIG. 1, through a buffer memory. In all the octets except the 16th octet of the first and second signal time slots, only 4 of 8 bits are used while the remaining 4 bits have a pattern allotted thereto which is a different pattern from the multiframe pattern (MTFP), thereby to facilitate the multiframe synchronization. FIG. 6B shows a signal time slot construction on the time division highway for one system of a 30 channel digital transmission line. The signal path construction on the 30 channel digital transmission line shown in FIG. 2B is applied to this construction as it is. For this, no signal path transfer unit is needed in this case.

The various monitor and control information mentioned above, when transmitted, provides a inventive signal monitoring and controlling system by the main link method in the time division switching system. The main components to systematically realize the signal monitoring and controlling system are collectively included in the signal controller 18 shown in FIG. 1. The explanation of the construction of the signal controller 18 will be made below.

Figure 7:
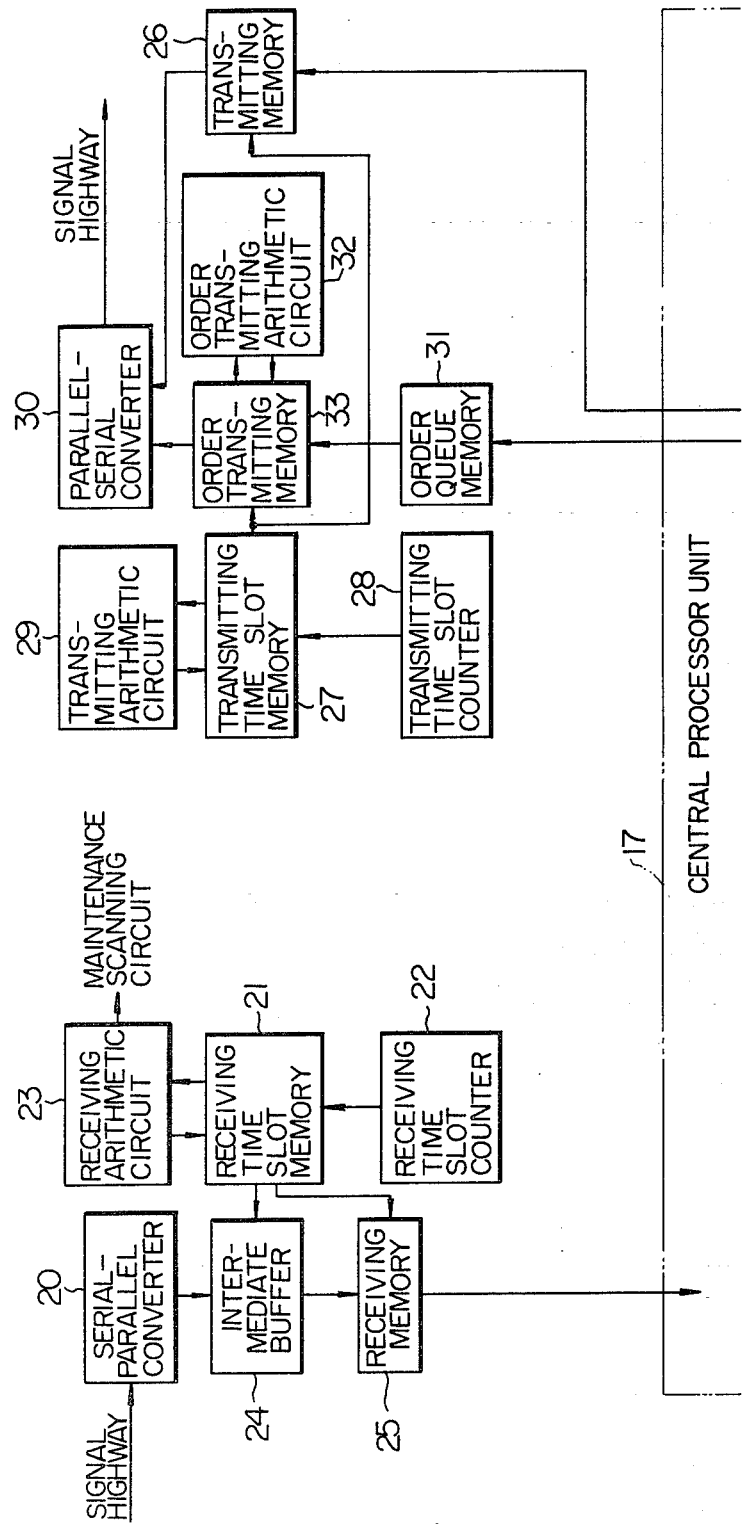
FIG. 7 shows a block diagram of a signal controller according to the invention.

FIG. 7 shows a block diagram of a signal controller 18 for realizing the signal monitoring and controlling system according to the invention. In FIG. 7, reference numeral 20 designates a serial-parallel converter for converting serial incoming monitor information on the signal highway, after stored with 8-bit blocks, into parallel code information. A receiving time slot memory designated by numeral 21 is a memory storing a control word for executing a monitor information receiving control, with a construction that it is addressed by a receiving time slot counter 22 which executes the counting operation in synchronism with the signal time slots of the signal highway, and the control word is read out to a receiving arithmetic circuit 23 in synchronism with the receiving time slot. The control word of the receiving time slot memory 21 has the construction as shown in FIG. 8. Numeral 24 designates an intermediate buffer for temporarily storing 32 octets forming each octet group with respect to only the first signal time slot relating to the subscriber's line concentrator 1, in the receiving octets. Under this condition, 32 octets are put to a CRC code under control of the receiving time slot memory 21. When the CRC code shows their normality, those are transferred to a receiving memory 25. On the other hand, when the CRC code shows some abnormality thereof, those are relinquished. The remaining signal time slots are directly stored in the receiving memory 25, without passing through the intermediate buffer 24. The reason why the first time slot of the subscriber's circuit is so arranged is that the signal monitoring operation of small-scale line concentrators installed at remote locations must be correctly carried out to possibly minimize an erroneous operation arising from a transmission error.

FIG. 8 shows a construction of the control word within the receiving time slot memory for executing the receiving control. It is so designed that the control word corresponding to the signal time slot is read out in synchronism with the signal time slot received. In the control word, a signal time slot class CLS stores a designation that the corresponding signal time slot is the one of the group of the subscriber's line concentrator 1, the analog trunk equipment, or the 24-channel digital trunk or the 30-channel digital trunk, and an indication of the first or second time slots. Therefore, the signal time slot class CLS makes different the contents of control. Further continuing the explanation of the construction of the control word, an address counter ADCNT specifies the address on the receiving memory 25 where the octet received is stored. A multiframe counter MFCNT counts the multiframe determined by each signal time slot class. A guard counter GCNT is a multiframe guard counter for monitoring the front protection and the back protection relating to the multiframe. SYNST is a multiframe synchronizing status for indicating the statuses "synchronization normal", "front protection", "back protection" and "asynchronous" and realizes the multiframe synchronizing control together with the multiframe counter MFCNT and the guard counter GCNT. A last look LL temporarily stores 4 bits in one octet in the effective octets on the receiving signal time slots and loads the stored bits together with the four bits in the succeeding octet into the receiving memory 25. An indication D/S of 8 bits/4 bits is used with the last look LL to indicate whether information is represented by four or eight bits. An ACK detection (AD) and an NAK detection (ND) detect the indication of "execution complete" and "execution not complete" for the order transmission to the subscriber's line concentrator and the analog trunk equipment, respectively, and is used to control the transmission. An address last look LADR is provided for a reason that, in the signal time slots for the monitor information of the subscriber's line concentrator shown in FIG. 4, octets in the line concentration speech path trunk repeatedly takes place in one frame and the sequence of the writing address to the receiving memory 25 is disordered and therefore the addresses must be stored temporarily. CRCM is an intermediate buffer for operation for executing the CRC attached to the monitor information from the subscriber's line concentrator 1. CRC code result CRC G/N indicates whether the check result is 'normal' or 'abnormal' and judges the transfer from the intermediate buffer 24 to the receiving memory 25. RM access stop RMSTP is a flag to stop an access to the receiving memory 25.

The monitor information disposed on the receiving time slot memory 21 is scanned and read out by the central processor unit 17. At that time, when trouble indication takes place within the subscriber's line concentrator 1 and the trunk, a pattern other than a normal pattern takes place in the information of the duplicate verifying result. This is indicated in the maintenance scanning circuit MSCN of the system. When the central processor unit 17 detects this indication, the details stored in a given address of the receiving memory 25 are read out and are used for system diagnosis.

Explanation will be given about the operation of the transmitting side in FIG. 7. The central processor unit 17 divides the control signal into the LC control order, trunk control order and SD information. The control order of the LC control order trunk is loaded into an order queue memory 31. After that, the transmitting control is left to the autonomous control of the signal controller 18. The transmission of the SD information is executed by updating the corresponding address in the transmitting memory 26. In the respective control words in the transmitting time slot memory 27 are included a signal time slot class path, a read address of the transmitting memory 26, and a multiframe counter. The control word of the transmitting time slot memory 27 is read out to a transmitting arithmetic circuit 29 through the addressing by the a transmitting time slot counter 28. The corresponding SD information is read out from the transmitting memory 26 by the read address for the transmitting memory 26 in the control word and the read out one is sent out to the signal highway, via the serial-parallel converter 30. Turning now to FIG. 9, there is shown a format of the control word for the transmitting time slot memory 27. In the construction of word, CLS designates a signal time slot class which is the same as that at the receiving side. SMACNT presents the address in the transmitting memory 26 of the SD information to be transmitted. ACNTSTP is a flag to stop the counting operation of the address in the transmitting memory 26 and MFCNT directs the generation of a transmitting multiframe. SMACNT, ADCNT, TSCNT and TRCNT cooperate to address the transmitting memory 26 and the receiving memory 25.

The LC control order and the trunk control order stored in the order queue memory 31 are each constructed by a control word including an order status transmission control for monitoring the order transmission control including the retransmission process, a buffer for generating CRC code, and the address of the order on the order queue memory 31. At the time of the control order transmitting octet on the transmitting signal time slots for the subscriber's line concentrator 1 and the analog trunk equipment, the order is read out from the order queue memory 31 and the read out one is temporarily stored as control information from the order transmitting arithmetic circuit 32 into the order transmitting memory 33 and then is transmitted to the parallel to serial converter 30. When "1" is indicated in the ACK detecting bit AD of the corresponding address in the receiving time slot memory 21, the next order is read out from the order queue memory 31 and is set out. When "1" is indicated in the NAK detecting bit ND, it is controlled so that the same order is retransmitted.

As seen from the foregoing description, the signal monitoring and controlling system using the main link in the time division switching system may be realized by the signal monitoring and controlling system according to the invention. The following effects are attained by the invention.

(1) The cable laying exclusively used for the signal transmission is unnecessary and therefore the number of the cables between frames is remarkably reduced.

(2) The signal monitoring and controlling operation of the subscriber's line concentrator, and analog or digital trunk controller may be collectively performed and the installation may flexibly be expanded or exchanged.

(3) Transmission and retransmission of the LC control order and the trunk control order are autonomously performed by the signal controller so that the processing load of the processor is alleviated.

(4) The monitor information generated at different times and with different periods are transmitted through the same signal time slot so that the signal time slot capacity may be compressed.

What is claimed is:

1. A signal monitoring and controlling system in a time division switching system for switching digital coded information, comprising:

a plurality of line interface means for monitoring and controlling status of lines;

a time division switch connected with said line interface means by signal time slots;

a signal controller connected with said time division switch by said signal time slots; and a central processor unit connected with said time division switch and said signal controller whereby, in a receiving mode, said signal controller includes means for receiving multiplex monitor information from the time division switch representing the status of said lines from said line interface means and means for transferring said monitor information to said central processor unit after demultiplexing said multiplex monitor information, and said central processor unit includes means for processing said monitor information, and, in a transmitting mode, means for providing control information for controlling the status of said lines to said signal controller in accordance with said monitor information, and said signal controller further includes means for transmitting said control information to said line interface means through said signal time slots after multiplexing said control information, wherein said signal controller comprises a first memory for storing plural pieces of control information read out from said central processor unit, a second memory for storing a plurality of control words for processing said control information pieces, a first counter for reading out said control words in synchronism with said signal time slots, a first arithmetic circuit including means for processing said control information pieces in accordance with said control words in a manner so that said control information pieces are classified into a cyclic signal needing renewal by transmitting a correct state with predetermined intervals and a random signal needing randomly a change of a state, a third memory for storing said classified control information pieces, and means for transmitting said classified control information pieces in a manner so that said classified control information pieces are read out at a given time with different transmitting time regions for said cyclic and random signals and multiplexed on said signal time slots by using a multi-frame technique whereby said cyclic and random signals are transmitted to said line interface means through a single signal time slot.

2. A signal monitoring and controlling system in a time division switching system for switching digital coded information, comprising:

a plurality of line interface means for monitoring and controlling status of lines;

a time division switch connected with said line interface means by signal time slots;

a signal controller connected with said time division switch by said signal time slots; and a central processor unit connected with said time division switch and said signal controller whereby, in a receiving mode, said signal controller includes means for receiving multiplex monitor information from the time division switch representing the status of said lines from said line interface means and means for transferring said monitor information to said central processor unit after demultiplexing said multiplex monitor information, and said central processor unit includes means for processing said monitor information, and, in a transmitting mode, means for providing control information for controlling the status of said lines to said signal controller in accordance with said monitor information, and said signal controller further includes means for transmitting said control information to said line interface means through said signal time slots after multiplexing said control information, wherein said signal controller comprises means for determining line interface means from which each received signal time slot multiplexed on a time division highway comes, said line interface means comprising at least one of an analog trunk equipment, a digital trunk equipment, an intra-office subscriber's line concentrator, and a remote subscriber's line, and wherein said signal controller comprises a first memory for storing plural pieces of control information read out from said central processor unit, a second memory for storing a plurality of control words for processing said control information pieces, a first counter for reading out said control words in synchronism with said signal time slots, a first arithmetic circuit including means for processing said control information pieces in accordance with said control words in a manner so that said control information pieces are classified into a cyclic signal needing renewal by transmitting a correct state with predetermined intervals and a random signal needing randomly a change of a state, a third memory for storing said classified control information pieces, and means for transmitting said classified control information pieces in a manner so that said classified control information pieces are read out at a given time with different transmitting time regions for said cyclic and random signals and multiplexed on said signal time slots by using a multi-frame technique whereby said cyclic and random signals are transmitted to said line interface means through a single signal time slot.

3. A signal monitoring and controlling system according to claims 1 or 2, wherein said signal controller comprises means for receiving plural pieces of monitor information multiplexed on said signal time slots by using a multiframe technique, a first memory for storing a plurality of control words for processing said received monitor information pieces, a first counter for reading out said control words from said first memory in synchronism with said signal time slots, a second memory for temporarily storing said received monitor information pieces, and a first arithmetic circuit including means for processing said received monitor information pieces in accordance with said control words in a manner so that said received monitor information pieces are demultiplexed and temporarily stored in said second memory and then read out by said central processor unit.

* * * * *